United States Patent Office 3,549,533
Patented Dec. 22, 1970

3,549,533
SINGLE PHASE EMULSION INHIBITOR
Wallace F. Tabor, Fullerton, and Paul M. Williamson, Garden Grove, Calif., assignors to Atlantic Richfield Company, Philadelphia, Pa., a corporation of Pennsylvania
No Drawing. Filed Nov. 22, 1968, Ser. No. 778,331
Int. Cl. C10m 1/46
U.S. Cl. 252—32.7          15 Claims

ABSTRACT OF THE DISCLOSURE

A lubricant emulsion inhibitor additive comprising blown castor oil, refined kerosene, and distilled tall oil and including antimony o,o-dialkylphosphorodithioate, a metal deactivator dialkyl-2,5-dimercapto-1,3,4-thiadiazole and a rust inhibitor, lauryoyloxyacetic acid and lubricant compositions containing the same are disclosed.

BACKGROUND OF THE INVENTION

Field of the invention

This invention relates to lubricant compositions and lubricant additive compositions. More particularly, this invention relates to non-emulsion forming lubricant compositions and to additives for lubricants to inhibit the formation of emulsions with water.

Description of the prior art

The separation of undesirable water contamination from petroleum oils, particularly after mechanical mixing, has long been a problem in lubricating oil systems. Mechanical methods have been used for removing water from oil. For example, centrifuging, heating, electrostatic and other means have been attempted. Chemical additives have also been used for this purpose. Generally, however, these methods require hours or days to effect separation of water and oil and, often, are never completely effective.

A new additive composition which may be used in a single phase with lubricants has been discovered which, in combination with lubricants, will cause the separation of water and oil in water-oil mixtures and emulsions in a matter of seconds. The object of this invention, therefore, is the provision of a single phase additive for lubricants and lubricants containing such additive to prevent the formation of water-oil emulsions and to cause the separation of water and oil in water-oil mixtures and emulsions.

SUMMARY OF THE INVENTION

In general, this invention relates to a lubricant additive comprising about 20 to 25 parts of blown castor oil, 20 to 25 parts of refined kerosene and 6 to 12 parts of distilled tall oil, preferably in combination with 25 to 50 parts of an extreme pressure additive antimony o,o-dialkylphosphorodithioate. The composition may also include 6 to 12 parts of alkyl-2,5-dimercapto-1,3,4-thiadiazole as a metal deactivator and 1 to 3 parts of lauroyloxyacetic acid as a rust inhibitor. The additive composition may comprise as much as 2 percent of the finished lubricant composition. It is, therefore, a principal object of this invention to provide a single phase lubricant additive to prevent the formation of water-oil emulsions and to cause the separation of such emulsions.

An additional principal object of the invention is to provide lubricant compositions having emulsion inhibiting characteristics.

A more specific object of the invention is the provision of a single phase emulsion inhibitor which includes blown castor oil, kerosene and distilled tall oil.

An important and more specific object of the invention is the provision of a lubricant additive comprising blown castor oil, kerosene, distilled tall oil and antimony ortho, ortho-dialkylphosphorodithioate.

The provision of an additive for lubricants to impart emulsion inhibiting characteristics to such lubricants is a general object of this invention.

The provision of the specific compositions set forth in the examples in the specification which follows constitutes additional and non-limiting objects of the invention.

Other objects of the invention will become apparent from the specification which follows.

DESCRIPTION OF THE PREFERRED EMBODIMENTS

As indicated previously, the rapidity of separation of water and lubricant is a major factor in the success of any lubricant system. The emulsion inhibitor composition of this invention will bring about complete separation of water from oil within seconds without the necessity of mechanical action. Furthermore, the additive of this invention prevents the formation of emulsions.

This additive is composed of several materials which, individually, fail to give the desired water separation characteristics to a petroleum lubricant. When these materials are combined, however, in the correct ratio, in lubricant, a product having excellent water separation characteristics results.

Furthermore, this additive composition contributes rust inhibiting characteristics and extreme pressure qualities to the lubricant without adversely affecting the water separation characteristics.

The additive composition of this invention is effective even when the lubricant is exposed to waters of varying hardness, including ocean sea water.

These additives are in the form of a single phase concentrate which does not settle on storage and which is compatible with all lubricant oils.

The oils containing additives of this type are useful in the lubrication of heavily loaded bearings used in steel mill operations where the rapid elimination of water contamination is essential. Specifically, this lubrication composition, including the emulsion inhibiting additive, is used to lubricate journal bearings used in the backup rolls of a steel rolling mill. The operating temperatures in these units is generally comparatively low and, using the additive of this invention, no heating is required to settle these lubricant compositions.

The basic components of the inventive additive composition are blown castor oil, refined kerosene and distilled tall oil; however, the inclusion of antimony o,o-dialkylphosphorodithioate, a known extreme pressure additive, not only imparts extreme pressure characteristics to the lubricant but, quite surprisingly, dramatically increases the water-oil separation effectiveness. Metal deactivators such as dialkyl-2,5-dimercapto-1,3,4-thiadiazole and rust inhibitors such as lauroyloxyacetic acid are, respectively, effective for the particular purposes indicated and do not detract from the emulsion inhibiting characteristics. Indeed, the metal deactivator alkyl-2,5-dimercapto-1,3,4-thiadiazol slightly improves the emulsion inhibiting characteristics of the composition.

The blown castor oil used in this invention comprises a polymerized (oxidized) triglyceride of fatty acids. The fatty acid content comprises about 85 percent ricinoleic acid with lesser amounts of oleic acid, linoleic acid, stearic acid and dihydroxy stearic acid. Viscosities up to 50 stokes at 25° C. are useful in this invention but as the viscosity increases significantly above 50 stokes, the effectiveness of this component in the composition of this invention is reduced and the effect eventually disappears at higher molecular weights. Acid numbers typically may be in the range of about 5 to 17, iodine values may be in the range of 60 to 80, saponification values may be in the range of 185 and 212 and viscosities may range from about 10 to about 50. A preferred source of the blown castor oil component of this invention is known commercially as Pale Oil No. 4 obtainable from the Baker Castor Oil Company, New York, N.Y. This material has a density, at 15° C., of from 8.37 to 8.39 pounds per gallon, a specific gravity, 15° C./4° C. of from 1.003 to 1.005, a refractive index at 25° C. of 1.479 to 1.481, an acid value of 16.0 to 20.0, an iodine value of 55 to 65 and a saponification number of 190 to 220. The viscosity is about 30 stokes at 25° C.

Any good quality domestic kerosene may be used as the second component of this composition. For safety reasons, the flash point should not be lower than 73° F. These kerosenes typically have a distillation range of from 350° F. to 550° F. Materials meeting domestic kerosene specifications are satisfactory but other materials having similar boiling point ranges, such as a light diesel, are not satisfactory.

The last of the three components essential to the production of the compositions and lubricants of this invention is a distilled tall oil, preferably containing a high percentage of resin acids. Preferred tall oils contain about 29 percent resin acids and a total of about 69 percent fatty acids and have a saponification value from about 192 to about 197. Distilled tall oils in general are satisfactory but the distilled tall oil marketed commercially under the trademark Acintol D by Arizona Chemical Company, New York, N.Y., has been found most satisfactory. Typical analyses of this product are shown in Table I.

Company, Inc., New York, N.Y. under the trademark Vanlube 622. In addition to imparting extreme pressure characteristics to the lubricant compositions of this invention, this additive, quite surprisingly, significantly increases the effectiveness and completeness of the water-oil separating effectiveness of the composition.

The antimony o,o-dialkylphosphorodithioate of this invention is a liquid having an ASTM color of less than 4, a specific gravity of 1.335, a viscosity at 212° F. of not more than 55 SUS, a flash point of at least 330° F. and a pour point of −30° F. maximum. The antimony content is from 10.5 to 12.5 percent, the sulfur content is at least 17.5 percent and the phosphorous content is from 7.5 to 9 percent.

While not necessary to the composition, other additives may be included. A metal deactivator, an alkyl 2,5-dimercapto-1,3,4-thiadiazole described in U.S. Pats. 2,719,125, 2,719,126 and 2,983,716 gives slight improvement in the water separation effectiveness but may be omitted without significantly affecting the emulsion inhibiting characteristics of the composition. Rust inhibitors, such as lauroyloxyacetic acid may also be included but no emulsion inhibiting effect has been observed. The alkyl-2,5-dimercapto-1,3,4-thiadiazole is available commercially from Amoco Chemical Corporation, Chicago, Ill. under the trademark Amoco 150 and lauroyloxyacetic acid is available from Sinclair Refining Company, New York, N.Y. under the trademark RD-132. Other inhibitors may be substituted without significant effect upon the essential emulsion inhibiting characteristics of this invention. The additive composition of this invention comprises not more

TABLE II.—COMCENTRATION OF COMPONENTS OF ADDITIVE AND LUBRICANT

| Component | Concentration in additive | | | Concentration in lubricant | | |
|---|---|---|---|---|---|---|
| | Maximum, parts | Optimum, parts | Minimum, parts | Maximum, percent | Optimum, percent | Minimum, percent |
| Blown castor oil | 115 | 19 | 0.8 | 1.52 | 0.25 | 0.01 |
| Domestic kerosene | 115 | 19 | 0.8 | 1.52 | 0.25 | 0.01 |
| Distilled tall oil | 45 | 8 | 0.03 | 0.60 | 0.10 | 0.004 |
| Sb o,o-dialkylphosphorodithioate | 276 | 45 | 0.2 | 3.64 | 0.60 | 0.02 |
| Dialkyl-2,5-dimercapto-1,3,4-thiadiazole* | 45 | 8 | 0.03 | 0.60 | 0.10 | 0.004 |
| Lauroyloxyacetic acid* | 9 | .2 | 0.08 | 0.12 | 0.02 | 0.001 |

*These components contribute little, if any, emulsion inhibiting characteristic and other compatible inhibitors may be substituted.

TABLE I

Typical analysis of Acintol D distilled tall oil

Property: Distilled tall oil
  Color, Gardner, 1933 _____ 8
  Acid value _____ 190
  Saponification value _____ 194
  Iodine value (Wijs) _____ 157
Composition:
  Moisture, percent _____ 0.1
  Ash, percent _____ 0.001
  Rosin acids, percent _____ 29.0
  Unsaponifiables, percent _____ 2.2
  Fatty acids total, percent _____ 68.8
Fatty acid composition:
  Polyunsaturated, conjugated, as linoleic, percent _____ 8
  Polyunsaturated, non-conjugated, as linoleic, percent _____ 36
  Oleic, by difference, percent _____ 52
  Saturated, percent _____ 4
Specific gravity, 25°/25° C. _____ 0.945
Weight per gallon, 25° C., lbs _____ 7.86
Viscosity, Gardner-Holdt 25° C. _____ D
Viscosity, SUS, 210° F. _____ 53
Flash point, open cup, ° F. _____ 400
Fire point, open cup, ° F. _____ 437

The fourth component of the composition of this invention is an extreme pressure additive, antimony o,o-dialkylphosphorodithioate marketed by R. T. Vanderbilt than about 2 percent of the total weight of the finished lubricant. The range of concentrations of the respective components in the additive composition of this invention are shown in Table II above.

EXPERIMENTAL

Emulsion tests were conducted in accordance with ASTM method D-1401 using 53 mls. of water and 27 mls. of oil.

EXAMPLE 1

A blend of solvent refined mid-continent 95 VI and Western 85 VI base oils having an SUS viscosity of 2050 to 2150 at 100° F. were evaluated by the ASTM D-1401 method at both 130° F. and 180° F. as a reference standard. Separation was not complete after 24 hours at either 130° F. or 180° F.

EXAMPLE 2

The base oil of Example 1 was blended with 0.25 percent, by weight, of blown castor oil and evaluated at 130° F. and 180° F. Separation was incomplete after 24 hours at both temperatures.

EXAMPLE 3

The base oil used in Example 1 was blended with 0.25 percent of domestic kerosene and evaluated at 130° F. and 180° F. Separation was not complete after 24 hours at either temperature.

EXAMPLE 4

The base oil of Example 1 was blended with 0.10 percent by weight of distilled tall oil. This blend was evaluated at 130° F. and 180° F. Separation was not complete after 24 hours at either temperature.

EXAMPLE 5

The base oil used in Example 1 was blended with 0.60 percent by weight of antimony o,o-dialkylphosphorodithioate and evaluated at 130° F. and 180° F. Separation was not complete after 24 hours at either temperature.

EXAMPLE 6

The base oil of Example 1 was blended with 0.10 percent by weight of dialkyl-2,5-dimercapto-1,3,4-thiadiazole. The blend was then evaluated according to ASTM test D-1401 at 130° F. and 180° F. After 24 hours, separation was still incomplete at both temperatures.

EXAMPLE 7

The base oil used in Example 1 was blended with 0.02 percent by weight of lauroyloxyacetic acid and evaluated at 130° F. and 180° F. Separation was not complete after 24 hours.

EXAMPLE 8

The base of Example 1 was blended with 0.25 percent by weight of blown castor oil, 0.25 percent by weight of domestic kerosene, 0.10 percent by weight of distilled tall oil, 0.60 percent by weight of antimony o,o-dialkyl-phosphorodithioate, 0.10 percent by weight of dialkyl-2,5-dimercapto-1,3,4-thiadiazole and 0.02 percent by weight of lauroyloxyacetic acid. This blend was then evaluated by the ASTM test D-1401 at 130° F. and 180° F., as in the previous examples. Separation of the water and oil phases was complete in less than 3 minutes at both temperatures.

EXAMPLE 9

The test conditions of Example 8 were repeated using waters of varying hardness up to and including Pacific Ocean salt water. At both temperatures, separation of the water and oil phases was complete in less than 3 minutes at both temperatures.

Examples 1 through 9 were repeated substituting other base oils of the same viscosity range. For example, 100 percent 95 VI mid-continent (hydrofinished) oil, 100 percent 96 VI mid-continent (clay finished) oil and 100 percent 85 VI Western solvent treated base oil were tested according to the aforementioned procedure. In every case, substantially identical results were obtained.

The compositions of this invention are resistant to water washing of additives as illustrated by the following example:

EXAMPLE 10

The lubricant composition of Example 9 was water washed with hot distilled water at 180° F. and allowed to settle. The water was then drained from the oil phase. The procedure was repeated 6 times. The remaining oil was then tested under ASTM method D-1401 at 130° F. and 180° F. Separation was complete in less than 2 minutes at both temperatures.

Rust inhibition was satisfactory as illustrated by the following example:

EXAMPLE 11

The lubricant blend of Example 10 was tested under ASTM method D-665, procedure A. No rusting was evident during this test.

The extreme pressure characteristics of the lubricant are indicated by the following experiments:

EXAMPLE 12

A Timken test conducted on the oil in Example 1 resulted in a Timken satisfactory load of 13 lbs. The lubricant composition of Example 9 was similarly tested resulting in a Timken satisfactory load of 35 pounds.

EXAMPLE 13

A 4-Ball wear test under the conditions described in military specification MIL-L-17331E was conducted using the base oil of Example 1. An average wear (Ball) scar diameter of 0.63 mm. resulted. The lubricant composition of Example 9, including the emulsion inhibitor additive, under the same test conditions exhibited a wear (Ball) scar diameter of only 0.26 mm.

EXAMPLE 14

A copper corrosion test, ASTM D-130, was conducted at 212° F. for 24 hours using the composition of Example 8. A corrosion rating of 1b resulted.

EXAMPLE 15

The blended mid-continent and Western base oil used in Example 1 was blended with 0.25 percent blown castor oil, 0.25 percent domestic kerosene and 0.10 percent, (by weight), of distilled tall oil. This lubricant composition was then evaluated by the ASTM test D-1401 at 130° F. and at 180° F., as in the previous examples. Separation of the water and oil phase was complete within 3 minutes at both temperatures, except for a 1 ml. white cuff at the interface.

EXAMPLE 16

0.60 percent by weight of antimony, o,o-dialkylphosphorodithioate was blended into the composition of Example 15. The ASTM test D-1401 was repeated at the same temperatures. Separation of the water and oil phases was complete in less than 3 minutes at both temperatures, but there was no white cuff at the interface.

EXAMPLE 17

The composition of Example 15 was subjected to ASTM D-665 rust test, procedure A, and D-130 copper corrosion test at 212° F. for 24 hours. The sample failed both tests.

EXAMPLE 18

The base oil of Example 1 was blended with 0.5 percent, (by weight) of an additive concentrate comprising 25 parts, by weight, of blown castor oil, 25 parts of domestic kerosene, 10 parts of distilled tall oil, 60 parts of antimony, o,o-dialkylphosphorodithioate, 10 parts of dialkyl-2,5 - dimercapto-1,3,4-thiadiazole and 2 parts lauroyloxyacetic acid. This blend was evaluated by ASTM D-1401 at 130° F. Separation o fthe water and oil phase was complete in one hour. For a Morgoil this is considered to be about a maximum permissible separation time.

EXAMPLE 19

The base oil of Example 1 was blended with 0.8 percent, by weight, of the additive concentrate used in Example 18. This concentration of additive was not completely soluble in the base oil at room temperature (77° F.). The saturated oil was evaluated by ASTM D-1401 at 130° F. Separation of the water and oil phase was complete in less than 3 minutes.

As indicated by the preceding examples, the additives used in this invention provide properties in addition to their prime function as emulsion inhibitors. The elimination of any one of the components affects its lubricant characteristics; however, the inhibitors dialkyl-2,5-dimercapto-1,3,4-thiadiazole and lauroyloxyacetic acid may be omitted without severe detriment to the emulsion inhibiting characteristics or other inhibitors may be used. A large number of inhibitors are available and known to the art and may be substituted for those described.

Exemplary of the rust inhibitors are those marketed under the trademarks Ampholite and Paradine 6 and metal deactivators including Atlox 1045A polyoxyethylenesorbitol marketed by Atlas Powder Company and Butyl Zimate (zinc dibutyldithiocarbamate) and Vanlubes AZ and 26 marketed by R. T. Vanderbilt Company.

The additive of this invention is a valuable article of commerce and may be compounded according to individual user's specific needs. The components of the lubricant composition may be added individually or as an additive composition to the lubricant base oil prior to marketing. Generally, the level of emulsion inhibitor additives should be kept below about 2.0 percent and is preferably of the order of about 1.0 percent. For certain special application, additive levels of less than 0.2 percent or above 2.0 percent may be desirable.

Modifications and variations from the precise examples given herein will be obvious to those skilled in the art from the foregoing teachings. Such modifications as may be obvious may be made without departing from the spirit and scope of the invention as defined in the following claims.

We claim:

1. A lubricant additive consisting essentially of effective amounts of blown castor oil having a fatty acid content comprising a major proportion of ricinoleic acid and minor proportions of oleic acid, linoleic acid, stearic acid, and dihydroxy stearic acid and having a viscosity from about 10 to about 50 stokes at 25° C.; kerosene having a flash point above 73° F. and having a distillation range from about 350° F. to about 550° F.; and distilled tall oil having a major proportion of fatty acids and a minor proportion of resin acids and having a saponification value of from about 192 to about 197.

2. The additive of claim 1 further including an effective amount of antimony o,o-dialkylphosphorodithioate.

3. The additive of claim 1 wherein the blown castor oil comprises from 0.8 to 115 parts, the kerosene comprises from 0.8 to 115 parts and the distilled tall oil comprises from 0.03 to 45 parts, by weight, of the composition.

4. The additive of claim 3 wherein the blown castor oil comprises about 19 parts, the kerosene comprises about 19 parts and the distilled tall oil comprises about 8 parts, by weight, of the composition.

5. The additive of claim 4 further comprising about 45 parts, by weight, of antimony o,o-dialkylphosphorodithioate.

6. The additive of claim 3 further comprising 0.2 to 276 parts, by weight, of antimony o,o-dialkylphosphorodithioate.

7. The additive of claim 6 further including an effective amount of a compatible metal deactivator selected from the group consisting of dialkyl-2,5-dimercapto-1,3,4-thiazole, polyoxyethylene sorbitol, and zinc dibutyl dithiocarbamate.

8. The additive of claim 7 wherein the metal deactivator is dialkyl-2,5-dimercapto-1,3,4-thiadiazole and further including lauroyloxyacetic acid as a rust inhibitor.

9. A composition comprising a hydrocarbon lubricating oil base and a minor emulsion inhibiting amount of a combination of additive components consisting essentially of effective amounts of blown castor oil having a fatty acid content comprising a major proportion of ricinoleic acid and minor proportions of oleic acid, linoleic acid, stearic acid, and dihydroxy stearic acid and having a viscosity of from about 10 to about 50 stokes at 25° C.; kerosene having a flash point above 73° F. and having a distillation range from about 350° F. to about 550° F.; and distilled tall oil having a major proportion of fatty acids and a minor proportion of resin acids and having a saponification value of from about 192 to about 197.

10. The composition of claim 9 further including an effective amount of antimony o,o-dialkylphosphorodithioate.

11. The composition of claim 9 wherein the blown castor oil comprises 0.01 to 1.52 percent, kerosene comprises 0.01 to 1.52 percent, and distilled tall oil comprises 0.004 to 0.6 percent of the total composition.

12. The composition of claim 11 further including 0.02 to 3.64 percent of antimony o,o-dialkylphosphorodithioate.

13. The composition of claim 11 wherein the blown castor oil comprises about 0.25 percent, the kerosene comprises about 0.25 percent and distilled tall oil comprises about 0.10 percent of the composition.

14. The composition of claim 13 further including about 0.60 percent of antimony o,o-dialkylphosphorodithioate.

15. The composition of claim 14 further including an effective amount of a compatible metal deactivator selected from the group consisting of zinc dibutyldithiocarbamate, polyoxyethylene sorbitol, and dialkyl-2,5-dimercapto-1,3,4-thiazole and lauroyloxyacetic acid as a rust inhibitor.

References Cited

UNITED STATES PATENTS

| 2,719,125 | 9/1955 | Roberts | 252—47 |
| 3,130,159 | 4/1964 | Stedt | 252—565 |
| 3,267,056 | 8/1966 | Ihde et al. | 252—28 |
| 3,428,563 | 2/1969 | Lowe | 252—32.7E |

FOREIGN PATENTS

| 844,280 | 8/1960 | Great Britain | 252—565 |

DANIEL E. WYMAN, Primary Examiner

I. VAUGHN, Assistant Examiner

U.S. Cl. X.R.

252—47, 56, 59, 358